United States Patent
Bao et al.

(10) Patent No.: US 6,577,685 B1
(45) Date of Patent: Jun. 10, 2003

(54) PROGRAMMABLE DIGITAL SIGNAL PROCESSOR FOR DEMODULATING DIGITAL TELEVISION SIGNALS

(75) Inventors: Jay Bao, Bridgewater, NJ (US); Shiyu Zeng, Red Bank, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/366,005

(22) Filed: Aug. 2, 1999

(51) Int. Cl.[7] .............................. H03D 5/00; H04N 5/00
(52) U.S. Cl. ........................................ 375/327; 375/326
(58) Field of Search ................................ 375/320, 327, 375/376, 355, 375, 362, 326, 371; 348/731, 732, 735, 737

(56) References Cited

U.S. PATENT DOCUMENTS

| 5,739,874 A | * | 4/1998 | Badger et al. .............. 348/731 |
| 5,818,544 A | * | 10/1998 | Han ........................... 348/725 |
| 5,898,334 A | * | 4/1999 | Strolle et al. ................ 348/725 |
| 5,907,585 A | * | 5/1999 | Suzuki et al. ................ 375/324 |
| 6,031,880 A | * | 2/2000 | Li et al. ...................... 375/326 |
| 6,411,661 B1 | * | 6/2002 | Nguyen et al. ............. 375/336 |

OTHER PUBLICATIONS

Bao et al.; "A New Timing Recovery Method for DTV Receivers"; In *IEEE Transactions on Consumers Electronics*, vol. 44, No. 4, Nov., 1998; pp. 1243–1248.

* cited by examiner

*Primary Examiner*—Chi Pham
*Assistant Examiner*—Dung X. Nguyen
(74) *Attorney, Agent, or Firm*—Dirk Brinkman; Andrew J. Curtin

(57) ABSTRACT

A phase-lock loop circuit in a demodulator includes a timing recovery block and a carrier recovery block. The demodulator for demodulates a digital signal including symbols. The phase-lock loop includes an integrator processing a block of N samples to produce an average of the N symbols, and means for supplying the average of the N symbols to the timing recovery block and the carrier recovery block every NT period, where T is a sample time interval.

10 Claims, 10 Drawing Sheets

PROGRAMMABLE DIGITAL SIGNAL PROCESSOR FOR DEMODULATING DIGITAL TELEVISION SIGNALS

SUMMARY OF THE INVENTION

This invention relates generally to demodulators for digital television receivers, and more particularly to phase-lock loop units in demodulator front-ends.

BACKGROUND OF THE INVENTION

The era of digital television broadcasting in the United States began officially with the introduction of terrestrial services in November, 1998. It is expected that cable and satellite digital TV broadcasting will soon become available as well. In all three transmission media, i.e., terrestrial, cable, and satellite, MPEG-2 is the common standard for video coding at the source of television signals. Because of the similarity in video coding in the three transmission media, it is possible to share signal processing functional blocks in receivers for the three media. This is the so-called multi-mode digital television receiver.

In the multi-mode digital TV receiver, the conventional approach for implementing demodulators dictates a hardware solution. This is due to the high symbol rates, i.e., 10.76 MHz for 8VSB, 5.38 MHz for 256QAM, and up to 45 MHz for QPSK. Symbols can be, for example, six or eight bits. Hardware offers computational speed not attainable by software. However, specialized hardware is very difficult to change for future upgrades, the size of the chip is large, and the cost is relatively high when compared with implementation that use software and common digital signal processors.

Therefore, it is desired to provide an alternatives to hardware implemented demodulators. These alternatives would provide flexibility, low cost, without degradation of performance while demodulating symbols at a very high rate.

SUMMARY OF THE INVENTION

The invention provides means for updating timing and error recovery blocks of a demodulator front-end of a digital television receiver. A phase-lock loop circuit in a demodulator including a timing recovery block and a carrier recovery block. The demodulator for demodulating a digital signal including symbols. The symbols are sampled at a time interval equal to or a fraction of the symbol rate. The phase-lock loop includes an integrator processing a block of N samples to produce an average of the N samples, and means for supplying the average to the timing recovery block and the carrier recovery block every NT period, where T is a sample interval. As a feature, the phase-lock loop is under software control and can operate in any one of three block-based modes as determined by a frequency offset.

DETAILED DESCRIPTION OF PREFERRED EMBODIMENTS

Figure 1A:
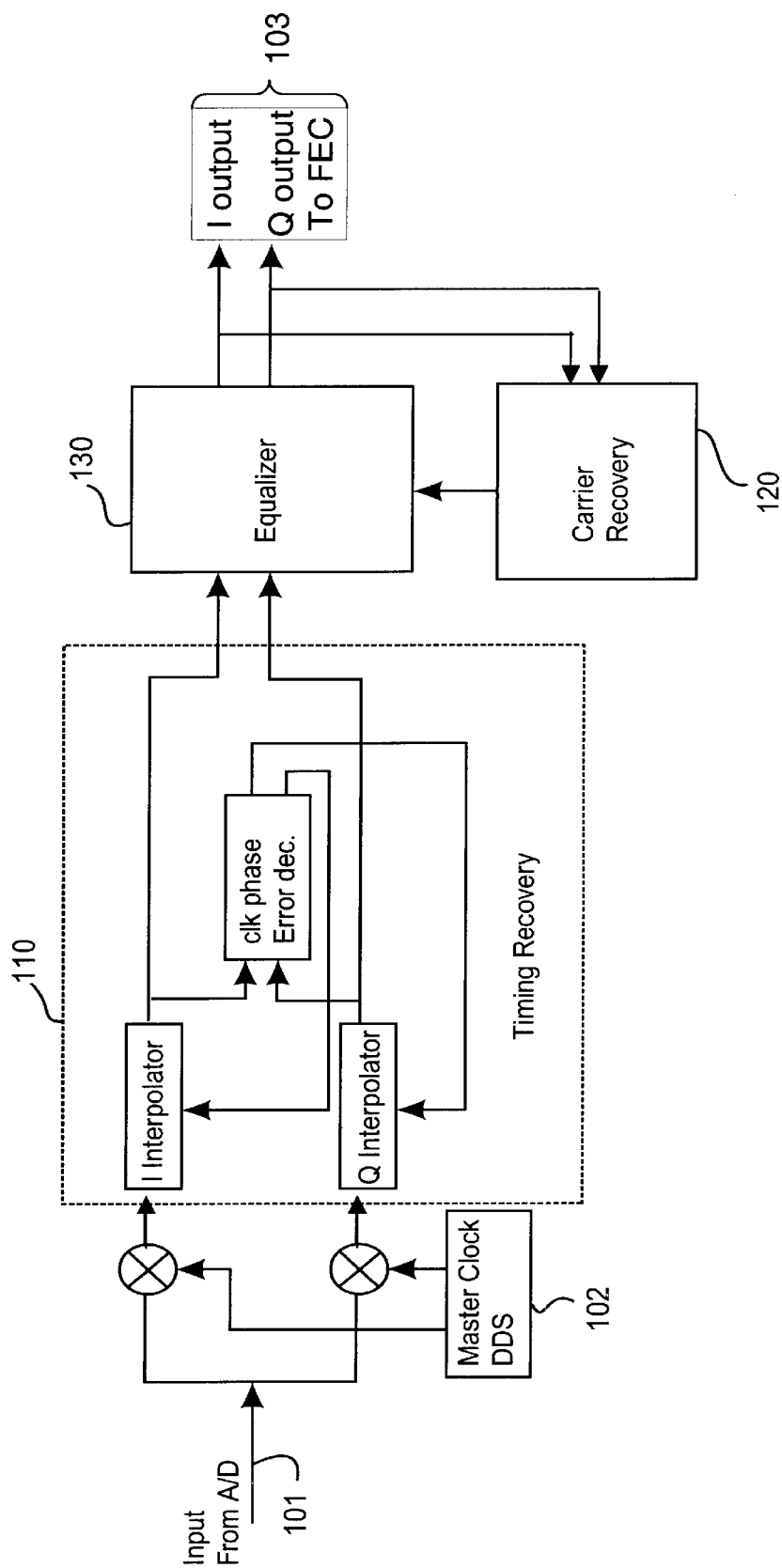
FIGS. 1A and 1B are block diagrams of a demodulator front-end for a digital television receiver that uses a phase-lock loop circuit according to the invention.
Figure 1B:
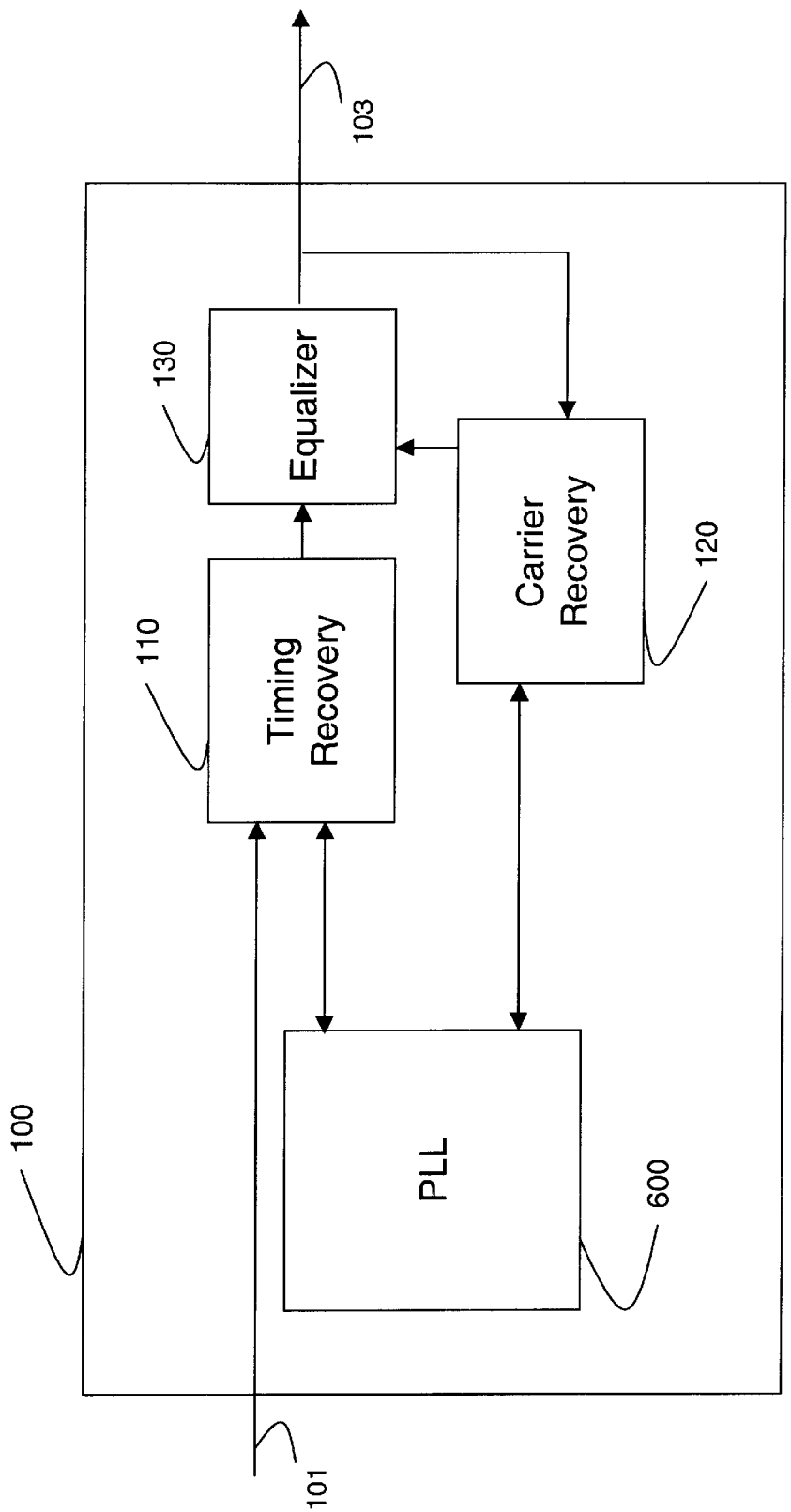

FIGS. 1A and 1B show a multi-mode demodulator front-end 100 for a multi-mode digital television receiver. In a preferred embodiment, the demodulator front-end 100 is implemented with general purpose programmable digital signal processors, and reconfigurable logic. As shown in FIG. 1A, the demodulator front-end 100 includes a timing change recovery (TR) block 110, a carrier recovery (CR) block 120, and an equalizer (EQ) 130. The front-end 100 receives a television signal as input 101 via an A/D unit, e.g., a tuner. A master clock 102 provides timing signals to the demodulator. The front-end can produce I and Q channels 103. as output to a forward error correction (FEC) unit.

For QAM and QPS signals, the TR, CR and EQ are all implemented in complex mode as both I and Q channels are used. For VSB, one has the choice of processing only the I channel, or processing both the I and Q channels. Under ideal reception condition, only the I channel contains information. The Q channel may provide improvements in non-ideal reception conditions.

The timing recovery block 110 uses an unsynchronized scheme as described by Bao et al. in "A New Timing Recovery Method For DTV Receivers," IEEE Trans. On Consumer Electronics, Vol. 44, No.4, pp. 1243–1249, 1998. Because of the high data rate, the input of the TR (interpolator) is implemented in configurable logic. The details of the logic design and implementation is described by Lu et al. in "Data receiver having variable rate symbol timing recovery with non-synchronized sampling," U.S. patent application Ser. No. 08/997,772.

An important functional element of the timing and carrier recovery blocks is a phase-lock loop (PLL) circuit. The PLL can be an element shared by both recovery circuits. In the preferred embodiment, the PLL for both timing and carrier blocks is implemented with software programmable digital signal processors (DSP) which processes a block of N samples at the time, instead of processing individual symbols. The processing produces an average of the block of N samples.

Because symbols are processed a block at the time, updating also happens at a lower rate, making a software implementation feasible. As an advantage of a software solution, low cost general purpose parts can be used, and the modality of operation can be done by down-loading different programs.

Figure 2:
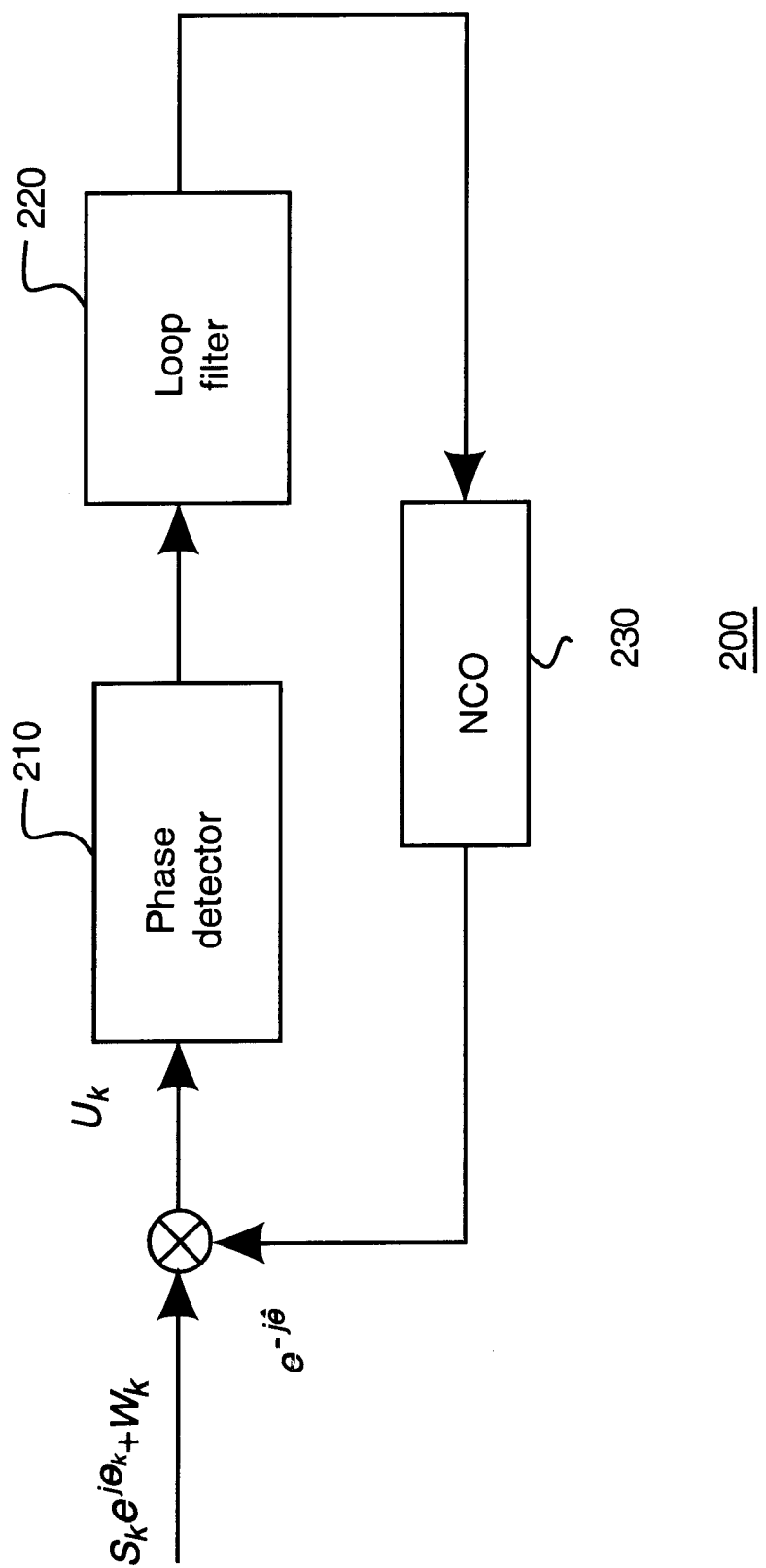
FIG. 2 is a block diagram of a phase-lock loop circuit.
Figure 3:
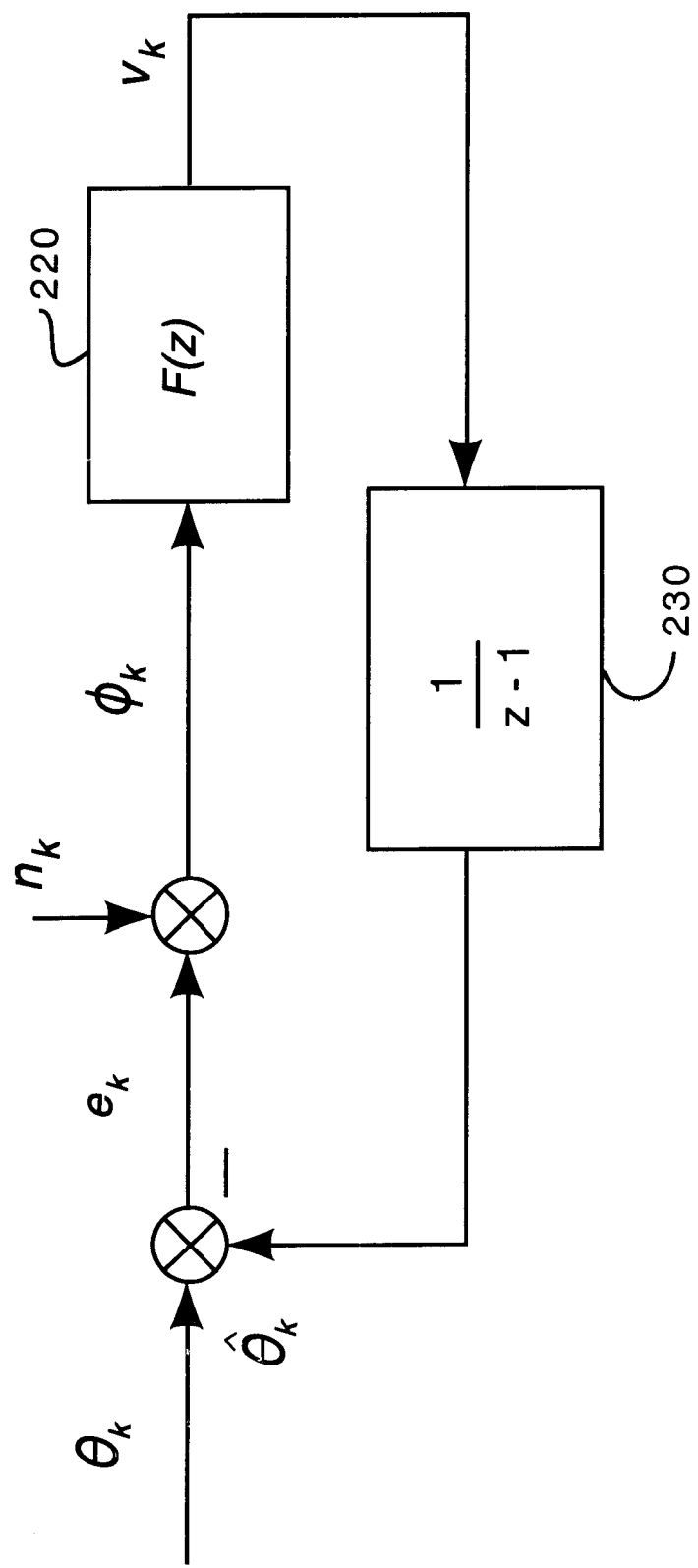
FIG. 3 is a linear model of the phase-lock loop circuit in steady state.

FIG. 2 shows the basic elements of a phase-lock loop circuit 200. The circuit includes a phase detector 210, a loop filter 220, and a numerically controlled oscillator (NCO) 230. FIG. 3 shows the PLL 200 as an approximated linear model while the PLL is in a steady state.

In the case where there is no noise, a transfer function can be expressed as:

$$H(z) = e(z)/\theta(z) = \frac{F(z)}{z-1+F(z)},$$

where F(z) is the transfer function of the loop filter 230, and e(z) and θ(z) are the Z-transform of the phase error $e_k$ and the phase offset $\theta_k$, respectively.

Figure 4:
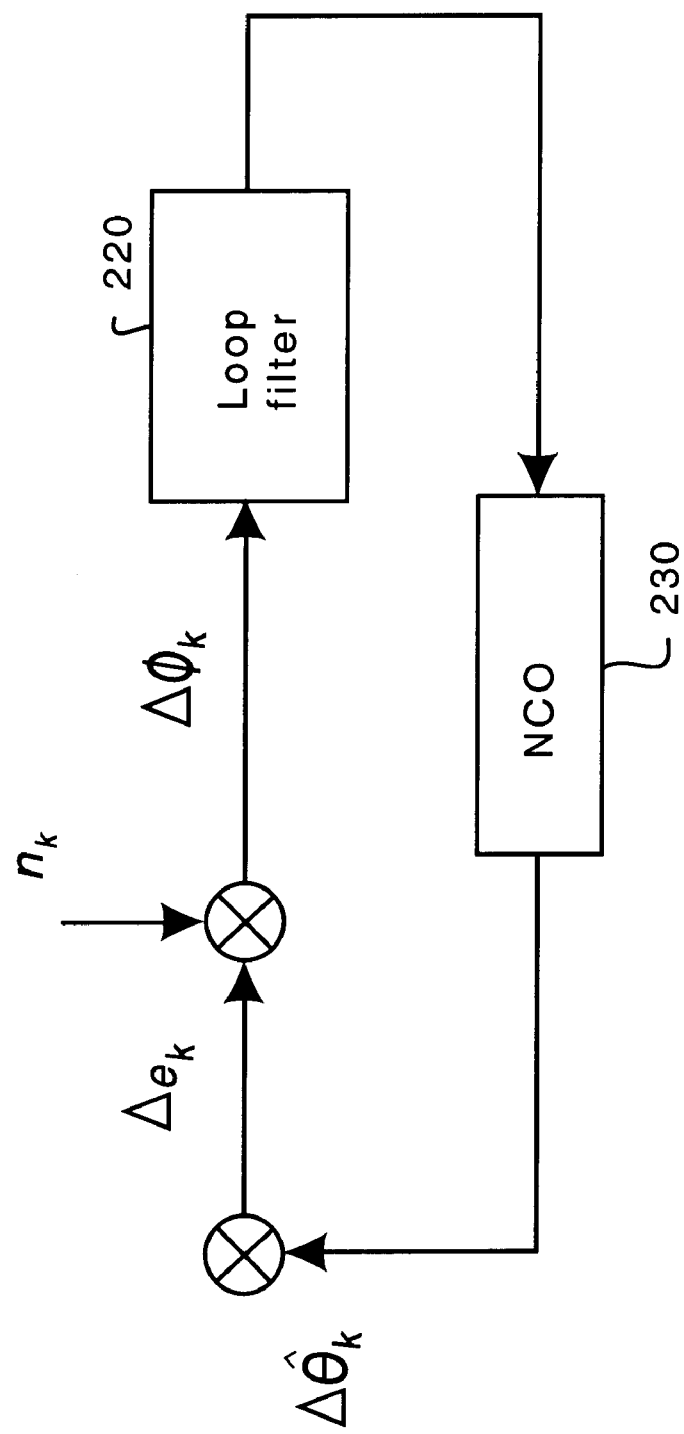
FIG. 4 is a block diagram of the phase-lock loop circuit considering noise.

FIG. 4 considers the effect of noise under the assumption that there is no input, in which case the phase error caused by the noise is:

$$\Delta e(z) = H(z)N(z),$$

and the phase error variance is:

$$Var\{e\} = \frac{1}{2SNR} \frac{1}{2\pi} \int_{-\pi}^{\pi} |H(\omega)|^2 \, d\omega$$

Figure 5:
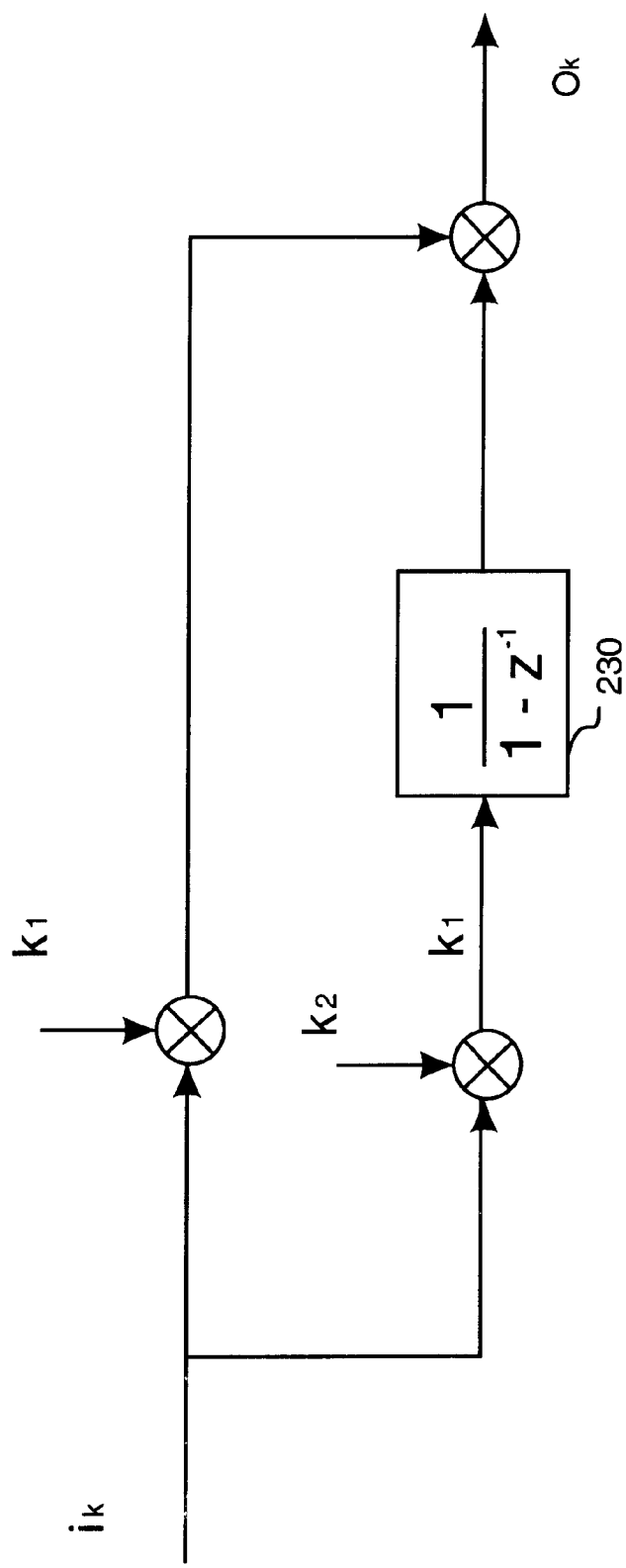
FIG. 5 is a block diagram of a second order phase-lock loop circuit in steady state.

A second order PLL, as shown in FIG. 5, has a transfer function of:

$$F(z) = O(z)/I(z) = k_2/(1-z^{-1}) + k_1.$$

Here, I(z) and O(z) are Z-transforms of the input and output of the loop filter respectively, and k1 and k2 are the loop gain control parameters. Thus, the transfer function of the PLL is:

$$H(z) = \frac{(k_1+k_2)(z-1)+k_2}{(z-1)^2+(k_1+k_2)(z-1)+k_2}$$

If the input $\theta(k)=\Delta\omega k$, then the Z-transform is:

$$\theta(z) = \frac{z}{(z-1)^2}\Delta\omega$$

and the stationary point of the phase error is:

$$e_s = \lim_{z\to 1}(z-1)e(z) = \lim_{z\to 1}(z-1)(1-H(z))\theta(z)$$

$$= \lim_{z\to 1}(z-1)\frac{z\Delta\omega}{(z-1)^2}\frac{(z-1)^2}{(z-1)^2+(k_1+k_2)(z-1)+k_2} = 0$$

Thus, the mean square error (MSE) of the phase error is equal to the variance of phase error which is in turn is a function of the loop gains $k_1$ and $k_2$.

The output Vk of the PLL 200 of FIG. 2 for an input $\theta(k)=\Delta\omega k$ is:

$$\hat\theta_{k+1} - \hat\theta_k = v_k$$

and in steady state this can be expressed as:

$$\hat\theta_k = \Delta\hat\omega k + \Delta\theta_k,$$
$$E\{\Delta\hat\omega\} = \Delta\omega$$
$$\therefore v_k = \Delta\hat\omega(k+1) + \Delta\theta_{k+1} - (\Delta\hat\omega k + \Delta\theta_k)$$
$$= \Delta\hat\omega + (\Delta\theta_{k+1} - \Delta\theta_k) \approx \Delta\hat\omega,$$
$$\therefore E\{v_k\} = E\{\Delta\hat\omega\} = \Delta\omega.$$

Thus, output $V_k$ of the loop filter 220 is approximately equal to the frequency offset Δω statistically as:

$$\hat\theta_{k+1} - \hat\theta_k$$

which is small in magnitude.

Block-Based Updating for the Loop Filter and NCO

Figure 6:
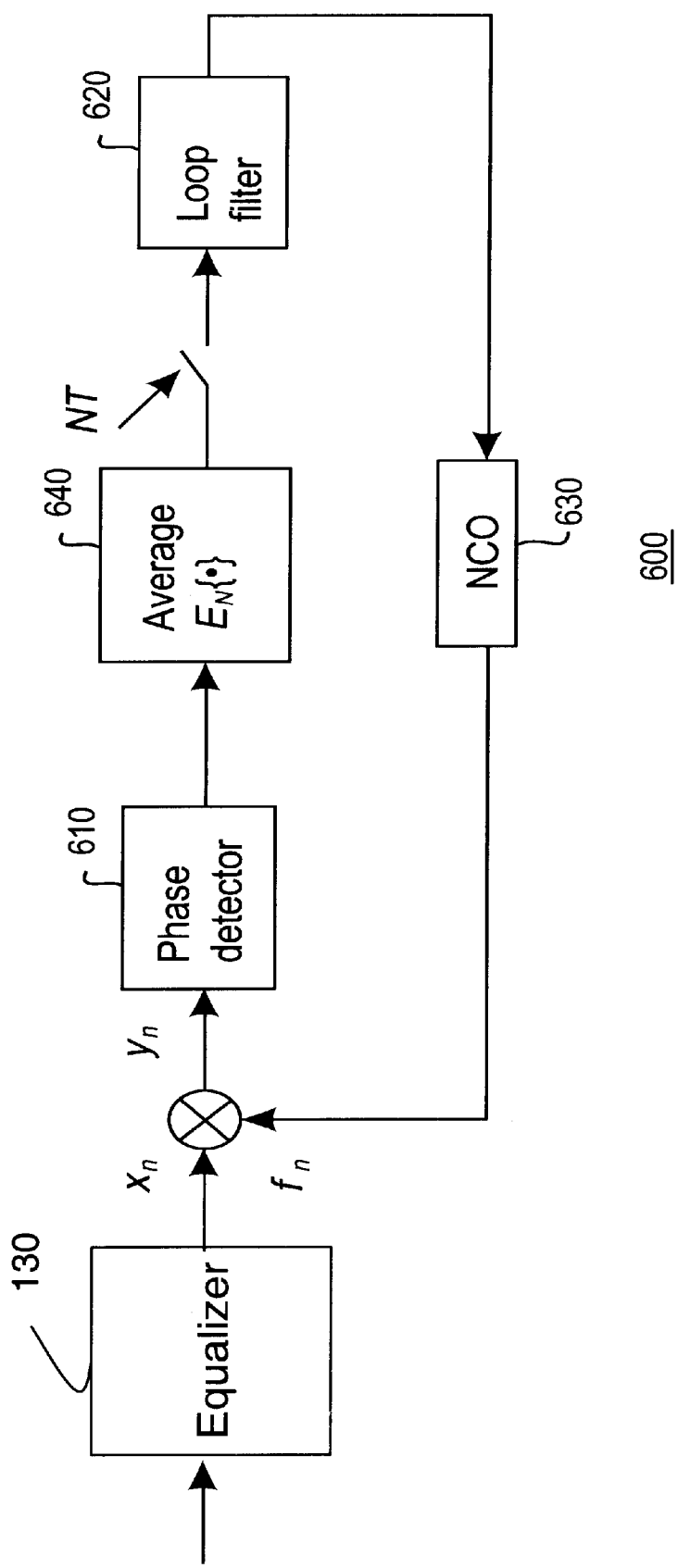
FIG. 6 is a block diagram of the phase-lock loop circuit including an integrator.
Figure 7:
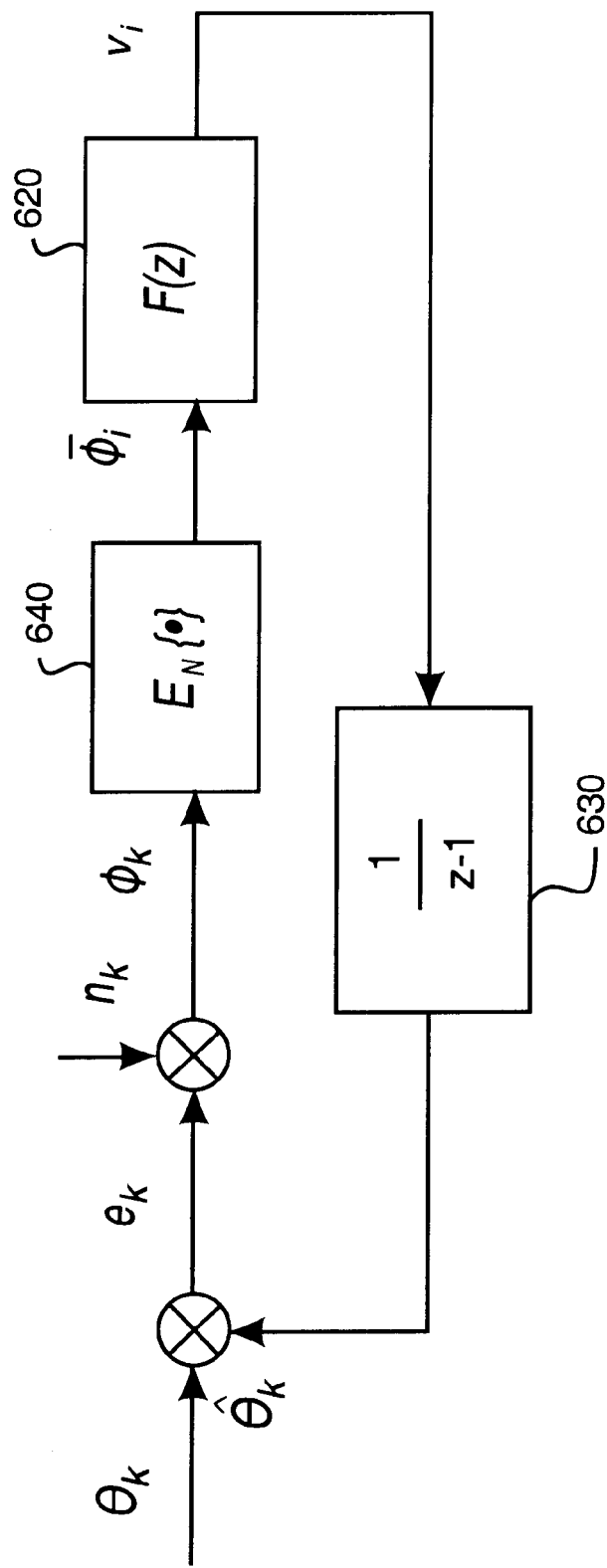
FIG. 7 is a linear model of the phase-lock loop circuit including the integrator in steady state.

The basic principles of block-based updating according to the invention are described with reference to FIG. 6. FIG. 6 shows a PLL circuit 600 for the CR block 120 of FIG. 1. As in FIG. 2, the PLL 600 includes a phase detector 610, a loop filter 620, and a NCO 630. However, the PLL 600 also includes an integrator 640 between the phase detector and the loop filter.

The phase detector 610 extracts a phase error from the output Xn of the equalizer 130. The loop filter 620 is a low-pass filter with two gain control parameters $k_1$ and $k_2$. It is possible to tune the PLL 600 for best performance based on a particular different mode by adjusting $k_1$ and $k_2$.

The integrator 640 takes an average of a block of N samples. The block size N can vary during different states, such as the acquisition state and the tracking state as described below. The average is supplied to the loop filter 620 every NT periods, where T is the sample time interval. In this embodiment, for timing recovery circuit, the sample rate, or 1/T, is twice of the input symbol rate; for carrier recover circuit, 1/T is the same as the symbol rate.

Because the number of operation the loop filter and the NCO is reduced by a factor of N, both elements can be implemented using software executing in a DSP.

The linear model of this scheme is shown in FIG. 6. Here, k=iN+j, and j=1,2, ... N. If the input is θ(k)=Δωk, as above then:

$$\hat\theta_{k+N} - \hat\theta_k = v_k$$

and in steady state, $$E\{\Delta\hat\omega\} = \Delta\omega$$
$$\hat\theta_{k+N} = \Delta\hat\omega(k+N) + \Delta\theta_{k+N},$$
$$\therefore v_k = \Delta\hat\omega(k+N) + \Delta\theta_{k+N} - (\Delta\hat\omega k + \Delta\theta_k)$$
$$= N\Delta\hat\omega + (\Delta\theta_{k+N} - \Delta\theta_k) \approx N\Delta\hat\omega,$$
$$\therefore E\{v_k\} = NE\{\Delta\hat\omega\} = N\Delta\omega.$$

Thus, the loop filter output Vk for block-based updating is N times larger than it would be for sample rate-based updating. This is equivalent to a NΔω frequency offset in sample rate-based updating scheme. If $k_1$ and $k_2$ are the same for both schemes, convergence time is about N times as in conventional sample rate-based updating.

Furthermore, for block-based updating, described with reference to FIG. 6, both theoretical derivation and simulation indicate that the mean of the phase error is not zero. This causes phase spread. In each block, the mean is:

$$\sum_i \{e_{iN+j}\} = \sum_i \{\theta_{iN+j} - \hat\theta_{iN+j}\}$$
$$= \sum_i \left\{\Delta\omega(iN+j) - N\Delta\omega i + \frac{N+1}{2}\Delta\omega\right\}$$
$$= \Delta\omega j - \frac{N+1}{2}\Delta\omega$$

Thus, the mean of the phase error is related to j which causes phase spread. When j=1,N, the maximum mean of the phase error is:

$$Peak\{e_k\} = \mp \frac{N-1}{2} \Delta\omega$$

This indicates that block-based updating described for FIG. 6 should only be used with small blocks, or a small frequency offset.

Block-Based Updating for Loop Filter

Figure 8:
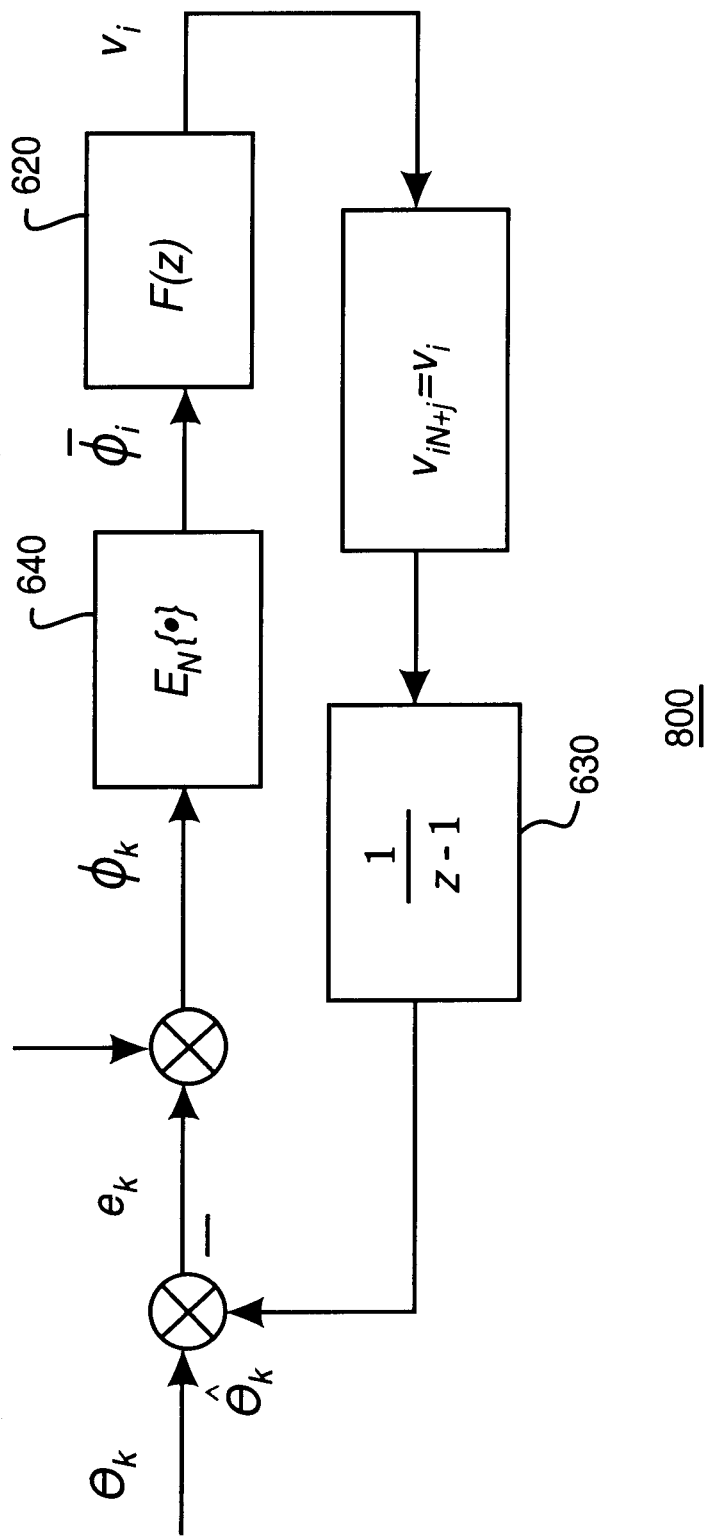
FIG. 8 is a is a block diagram of the phase-lock loop circuit including an integrator in a numerically controlled oscillator.

An alternative structure 800 is shown in FIG. 8. In this structure, sample rate-based updating is used in the NCO 630. In steady state:

$$\therefore \hat{\theta}_{iN+j} = \theta_{iN+j} = \Delta\omega(iN+j), v_k = v_{iN+j} = v_i \, j=1,2,\ldots,N$$

$$\therefore \hat{\theta}_{iN+j+1} - \hat{\theta}_{iN+j} = Nv_i = \omega(iN+j+1) - \Delta\omega(Ni+j) = \Delta\omega$$

$$\therefore v_i = \Delta\omega$$

$$\therefore e_{iN+j} = \theta_{iN+j} - \hat{\theta}_{iN+j} = 0,$$

Thus, there is no phase spread. Because the output Vk from the loop filter 620 has the same value as in sample rate-based updating, the transient time will be very short when switching from symbol-based updating to block-based updating. The overall time to converge for block-based updating is substantially the same as for sample rate-based updating.

Block-based Updating Phase Detector

Figure 9:
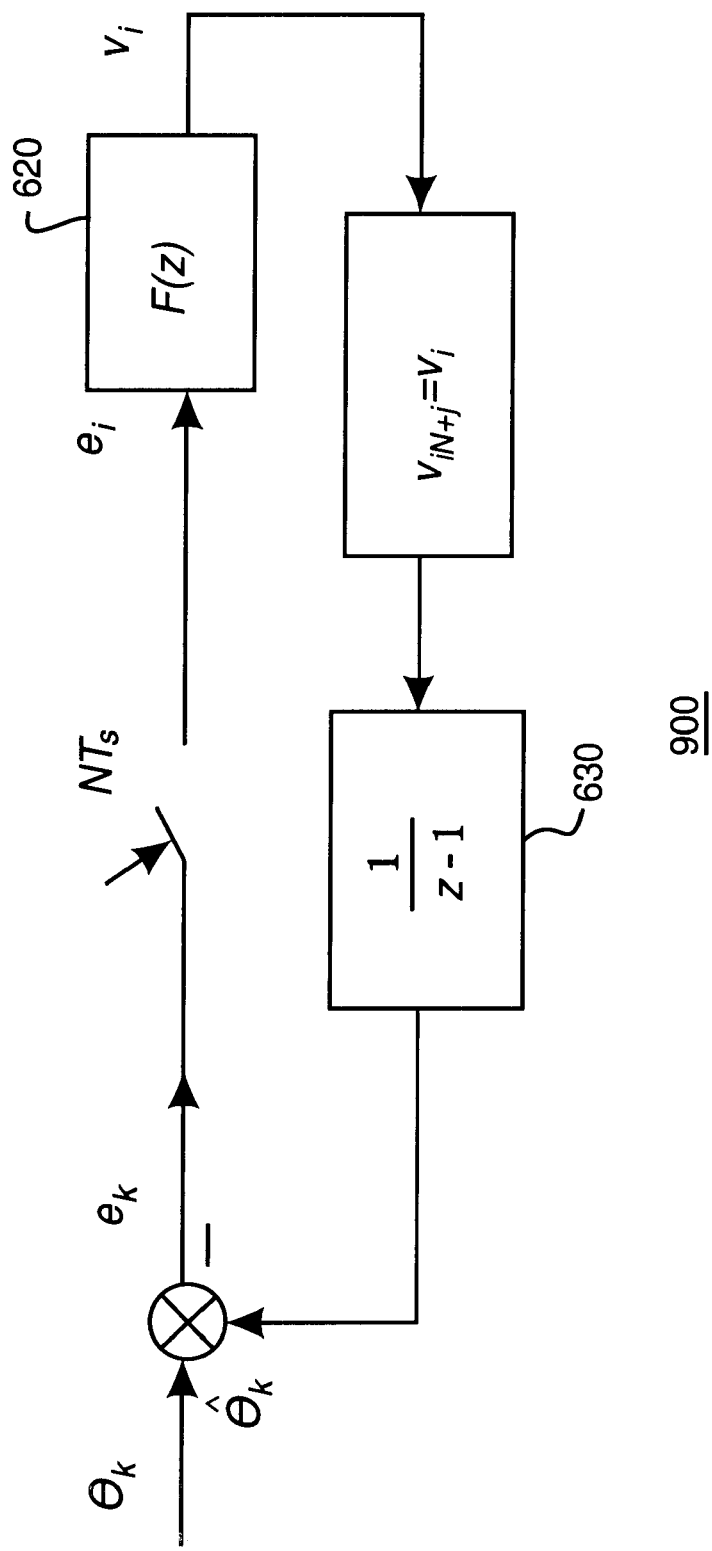
FIG. 9 is a block diagram of the phase-lock loop circuit including an integrator in the phase detector.

In another alternative structure 900, as shown in FIG. 9 in steady state, the phase detector 610 uses block-based updating. That is, the phase detector operates only at every NT period interval. Because the main computation of the PLL is in the phase detector, this alternative reduces the computation by about N times, and in steady state:

$$\therefore e_i = \theta_{iN} - \hat{\theta}_{iN} = 0$$

$$\therefore \hat{\theta}_i = \theta_i = \Delta\omega Ni, v_k = v_{iN+j} = v_i \, j=1,2,\ldots,N$$

$$\therefore \hat{\theta}_{iN+N} - \hat{\theta}_{iN} = Nv_i = \Delta\omega(Ni+N) - \Delta\omega Ni = \Delta\omega N$$

$$\therefore v_i = \Delta\omega,$$

Simulation Results

In performance of the block-based updating was simulated using a block size N of ten. The carrier frequency offset was about 2.5 kHz. The result was compared with conventional symbol-based updating. Because the frequency offset is small, the phase spread is not significant. The degradation of the signal-to-noise ratio with is minimal, and the convergence time is about 23,000 symbol, which is about four to five times longer than what can be achieved with conventional sample rate-based updating. Because the symbol rate of typical applications is 5.38 MHz, or higher, the convergence time remains insignificant.

To test the stability of two alternative structures, the carrier offset was varied, and the tracking and acquisition performance of the system was measured as a function of frequency offset. The results were compared to symbol-based updating. The following tables are the results for the two alternative structures.

TABLE 1

N = 1
Sample rate-Based Updating

| Frequency offset Δf (kHz) | 10 | 50 | 100 | 150 |
|---|---|---|---|---|
| Convergence time Tc (ksym) | 3 | 8 | 10 | 80 |
| Convergence time Tc (msec) | 0.56 | 1.49 | 1.86 | 14.87 |
| MSE σ^2 | 4.07E-06 | 6.54E-06 | 9.44E-06 | 1.11E-05 |

TABLE 2

N = 10
Block-Based Updating in Loop Filter

| Frequency offset Δf (kHz) | 10 | 50 | 100 | 150 |
|---|---|---|---|---|
| Convergence time Tc (ksym) | 3 | 8 | 16 | 84 |
| Convergence time Tc (msec) | 0.56 | 1.49 | 2.97 | 15.61 |
| MSE σ^2 | 1.49E-06 | 5.86E-06 | 6.26E-06 | 4.56E-06 |

TABLE 3

N = 10
Block-Based Updating in Phase Detector

| Frequency offset Δf (kHz) | 10 | 50 | 100 | 150 |
|---|---|---|---|---|
| Convergence time Tc (ksym) | 13 | 25 | 32 | 84 |
| Convergence time Tc (msec) | 2.2 | 4.65 | 5.95 | 15.61 |
| MSE σ^2 | 2.08E-5 | 4.67E-05 | 3.05E-05 | 4.18E-05 |

For these structures, symbol-based updating is done in acquisition mode, and block-based updating is done in tracking mode. The results given in Table 3 show almost no transient time for switching, and the performance is almost the same as for sample rate-based updating.

Because the loop filter operates about ten times slower this performance is almost the same as sample rate-based updating. Since loop filter is operated 10 times slower than sample rate-based updating, the operating speed is reduced by about a factor of ten.

Described is a method of implementing a demodulator front-end for a digital television receiver that uses a software programmable digital signal processor. The method updates timing and carrier recovery blocks, as well as other blocks, on a periodic basis, that is, a block of symbols, and not for every symbol as in the prior art. Combined with configurable logic portions, this method offers a completely programmable solution for the design of a digital television receiver demodulator front-end.

The block-based approach reduces processing speed by using adaptive block processing. Compared to sample rate-based updating that uses logic circuits, the block based updating has good performance with high flexibility, and thus is particularly suitable for multi-mode applications.

Three structures for block based updating are described. The first structure, which updates in both the phase detector and the loop filter, is the simplest to implement. The first alternative structure that updates only in the loop filter is preferred when the men square error is a concern. The second alternative offers the most reduction of implementation complexity, at a higher mean square error.

The block factor N should be relatively small to allow rapid lock on the carrier during initial signal acquisition, for example, in the range of two to four. Notice, a blocks size of one corresponds to sample rate-based updating. After a lock on carrier has been achieved, a larger block size, e.g., ten, can be used during tracking. The switching between acquisition mode and tracking mode is determined by the mean square error and the constellation diagram that graphical representations in two dimensions the carrier amplitude and phase at each sampling time.

The invention can also used in an automatic gain control (AGC) loop that uses a phase-lock loop. The processing speed requirements of AGC are much smaller than the symbol rate, thus making a DSP implementation desirable.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A phase-lock loop circuit in a demodulator including a timing recovery block and a carrier recovery block, the demodulator for demodulating a digital signal including symbols, comprising:

an integrator processing a block of N samples of the digital signal to produce an average of the block of N samples;

means for supplying the average to the timing recovery block and the carrier recovery block every NT period, where T is a sample time interval.

2. The circuit of claim 1 wherein the integrator is a software programmable digital signal processor.

3. The circuit of claim 1 wherein the integrator couples a phase detector and a loop filter of the phase-lock loop circuit.

4. The circuit of claim 1 wherein N is less than twenty.

5. The circuit of claim 1 wherein the phase-lock loop includes a phase detector processing the block of N samples.

6. The circuit of claim 1 wherein the phase-lock includes a loop filter and a numerically controlled oscillator processing the block of N samples.

7. The circuit of claim 6 wherein the loop filter is updated over N samples, N>1 and the phase detector and numerically controlled oscillator are updated at a sample rate.

8. The circuit of claim 1 wherein the phase-lock loop uses a block-based phase detector.

9. The circuit of claim 1 wherein the demodulator is under software control to operate in sample rate mode or block mode dependent on a frequency offset and carrier and timing acquisition condition.

10. The circuit of claim 1 where the samples are symbols when a sample rate is identical to a symbol rate.

\* \* \* \* \*